(12) United States Patent
Hermann et al.

(10) Patent No.: US 11,220,244 B2
(45) Date of Patent: Jan. 11, 2022

(54) SOFT TIPPED POLE AND BRAKING SYSTEM FOR RECREATIONAL USE

(71) Applicants: William G. Hermann, Portola Valley, CA (US); George D. Hermann, Portola Valley, CA (US); Robert S. Hermann, Portola Valley, CA (US)

(72) Inventors: William G. Hermann, Portola Valley, CA (US); George D. Hermann, Portola Valley, CA (US); Robert S. Hermann, Portola Valley, CA (US)

(73) Assignees: William G. Hermann, Portola Valley, CA (US); George D. Hermann, Portola Valley, CA (US); Robert S. Hermann, Portola Valley, CA (US)

( * ) Notice: Subject to any disclaimer, the term of this patent is extended or adjusted under 35 U.S.C. 154(b) by 0 days.

(21) Appl. No.: 15/010,405

(22) Filed: Jan. 29, 2016

(65) Prior Publication Data

US 2016/0221548 A1    Aug. 4, 2016

Related U.S. Application Data

(60) Provisional application No. 62/109,466, filed on Jan. 29, 2015.

(51) Int. Cl.
*B60T 1/14* (2006.01)
*A63C 17/14* (2006.01)
(Continued)

(52) U.S. Cl.
CPC .............. *B60T 1/14* (2013.01); *A63C 17/045* (2013.01); *A63C 17/1436* (2013.01); *A63B 69/0093* (2013.01); *A63C 2017/149* (2013.01)

(58) Field of Classification Search
CPC ........ A63C 17/04; A63C 17/045; A63C 17/14; A63C 17/1436; A63C 17/1445; A63C 2017/1463; A63C 2017/1472; A63C 2017/1481; A63C 2017/149; A63C 17/0013; A63C 7/108; A63C 17/1463;
(Continued)

(56) References Cited

U.S. PATENT DOCUMENTS

| 339,786 | A | * | 4/1886 | Kayes | ................ | A63C 17/0013 |
| | | | | | | 280/826 |
| 1,985,726 | A | * | 12/1934 | Heldman | ........... | A63C 17/0013 |
| | | | | | | 280/826 |

(Continued)

FOREIGN PATENT DOCUMENTS

DE       2723107    * 11/1978
DE    102011050459   * 11/2012

*Primary Examiner* — Vishal R Sahni
(74) *Attorney, Agent, or Firm* — Cooley LLP

(57) ABSTRACT

Soft-tipped pole designs and methods for their use on pavement are disclosed. The soft, gripping pole tip can slow down a roller skier or skateboarder by slowing down the rider directly and by providing increased rider stability during breaking. This is accomplished by the rider pressing one or two pole tips against the pavement, with or without the use of a fulcrum point for increased leverage. The soft rubberlike tip has a large surface area that provides durability as well as variable levels of frictional force imparted against the pavement. The fulcrum for the pole can be the user's arm or leg as well as fulcrum element fastened to the rolling device.

9 Claims, 4 Drawing Sheets

(51) Int. Cl.
*A63C 17/04* (2006.01)
*A63B 69/00* (2006.01)

(58) Field of Classification Search
CPC ............ A63C 17/1472; A63C 17/1481; A63C 17/149; B60T 1/14
USPC .................... 280/809, 819, 821, 604, 219
See application file for complete search history.

(56) References Cited

U.S. PATENT DOCUMENTS

| | | | | |
|---|---|---|---|---|
| 2,179,592 | A * | 11/1939 | Goettie | A63C 17/14 280/11.214 |
| 3,767,220 | A * | 10/1973 | Peterson | A63C 17/1409 280/842 |
| 4,021,052 | A * | 5/1977 | Knowles | A63C 5/035 280/11.201 |
| 4,054,296 | A * | 10/1977 | Sullins | A63C 17/01 188/5 |
| 4,227,708 | A * | 10/1980 | Cote | A63C 7/108 280/604 |
| 4,386,794 | A * | 6/1983 | Roberts | A63C 3/04 280/11.208 |
| 5,163,710 | A * | 11/1992 | Chirtel | A63C 11/22 135/78 |
| 5,236,222 | A * | 8/1993 | Fletcher | A63C 17/0013 135/77 |
| 5,299,815 | A * | 4/1994 | Brosnan | A63C 17/1436 188/5 |
| 5,388,673 | A * | 2/1995 | Rohner, III | A63C 17/0013 188/5 |
| 5,647,599 | A * | 7/1997 | Visger | A63C 17/1436 188/5 |
| 5,653,468 | A * | 8/1997 | Ostapyk | A45B 1/02 135/66 |
| 5,662,562 | A * | 9/1997 | Wohlenberg | A61H 1/024 482/91 |
| 5,687,991 | A * | 11/1997 | Gairdner | A63C 3/00 135/85 |
| 5,704,617 | A | 1/1998 | Stoughton et al. | |
| 5,860,492 | A * | 1/1999 | Talaska | A63C 17/1436 188/5 |
| 5,938,240 | A * | 8/1999 | Gairdner | A63C 17/0013 135/85 |
| 7,677,600 | B2 | 3/2010 | Johnson | |
| 8,636,305 | B2 * | 1/2014 | Gonzalez | A63C 17/0013 280/219 |
| 8,636,306 | B2 * | 1/2014 | McBride | A63C 17/0013 135/77 |
| 9,724,593 | B2 * | 8/2017 | Sandusky | A63C 17/0013 |
| 2008/0231019 | A1 * | 9/2008 | Villani | A63C 17/045 280/604 |
| 2011/0101664 | A1 * | 5/2011 | Gonzalez | A63C 17/0013 280/821 |
| 2011/0175338 | A1 * | 7/2011 | Senseman | A63C 17/0013 280/821 |
| 2012/0049502 | A1 * | 3/2012 | Ascunce | A63C 17/0013 280/821 |
| 2012/0139224 | A1 * | 6/2012 | Weir | A63C 17/0013 280/821 |
| 2012/0326425 | A1 * | 12/2012 | Cubillo | A63C 17/0013 280/819 |
| 2013/0074893 | A1 * | 3/2013 | Palmer | A45B 9/04 135/68 |
| 2015/0140890 | A1 * | 5/2015 | Perlmutter | A63H 33/36 446/22 |

* cited by examiner

SOFT TIPPED POLE AND BRAKING SYSTEM FOR RECREATIONAL USE

CROSS-REFERENCE TO RELATED APPLICATIONS

This application claims priority to U.S. Provisional Application Ser. No. 62/109,466 filed Jan. 29, 2015, which is hereby incorporated by reference in its entirety.

FIELD

Described herein are sporting equipment for balance and braking in recreational, human powered wheeled vehicles such as skateboards, caster boards, roller skates and roller skis. The equipment generally consists of a soft tipped pole and may also include various components that can be incorporated into the vehicle itself, for example the roller ski. Methods for using the soft-tipped pole in braking systems in recreational wheeled human powered vehicles are further described.

BACKGROUND

It is often difficult to slow down or otherwise control a skateboard, roller skates and many other human powered wheeled vehicle riders via the methods and technologies that are currently available.

In skateboarding, for example, mechanisms of slowing down the skateboard (as in, for example the V-Brake from Skate-Safe Products) are in existence, but most mechanisms of braking are mounted to the skateboard itself, leading to challenges in maintaining balance during braking, particularly during intense braking. These and other approaches (e.g. toe dragging) require a relatively high level of skill and balance to perform safely, and toe dragging can lead to overheating of footwear. In roller skiing for example, toe dragging is not used and braking without any braking technology requires a very high level of skill (e.g. "snow-plowing") that is often beyond the skill set of most users. Mechanical braking systems have been designed and described for roller skis and in-line skates, for example in Johnson et al U.S. Pat. No. 7,677,600 and Stoughton et al U.S. Pat. No. 5,704,617. In these systems a braking element is pressed against a wheel of one roller ski via a lever system activated by the lower leg (Johnson et al) or activated via a waist-level pull cable by the hand (Stoughton et al). Their mechanical complexity, the need for multiple moving parts, and the need for proper adjustment), are shortcomings of the design. In addition, braking with these systems compromises to the user's ability to maintain balance during braking. A sudden need for braking can often occur at a moment when a loss of balance is particularly unwelcome. For example for some braking systems require a telemarking maneuver to maintain balance. For other systems, a hand activated cable must be located and activated in a very short period of time to avoid a collision or other type of accident. As the terrain gets hillier, or when roller-skiing speeds increase, challenges in user skill level are made even more apparent. For example, roller skiing on a long mountain road uphill is a great workout for skilled athletes and great training for other sports (e.g. winter cross country skiing), but when the roller-skier arrives at the top of the mountain road, the roller skier must often remove the roller skis and enter a vehicle to be driven back down the hill, as the ability to negotiate downhills safely are not within the abilities of most roller skiers.

SUMMARY

Described herein are designs and methods for providing balance and braking of human powered wheeled vehicles that roll on pavement and other rolling surfaces. The design entails the use of a soft gripping pole tip which can slow down the rider and vehicle (e.g. a roller skier or skateboarder) and by providing improved rider stability during braking. Braking and balance is accomplished by the rider manually orienting one or more poles in an angled position and pressing the pole tip against the rolling surface (e.g. pavement, asphalt or roller track). Increased drag of the pole tip against the rolling surface can be achieved via the use of a fulcrum region for increased leverage and hence increased braking force. The fulcrum region can be a portion of the body of the user (e.g. lower leg) or it may be a component of the vehicle itself. The pole tip is soft enough to increase the contact area between the pole tip and the rolling surface to enhance braking power as the braking force is applied. Soft tip designs include a laminated butyl rubber design with air gaps as well as foams and solid elastomers such as silicones to provide for grip along the rolling surface. Silicone elastomers remain relatively stable at the high temperatures that may be encountered during protracted braking (e.g. long downhills). The soft tips have an underlying rigid component for structural stability during propulsion, balance and braking. Thus a system is provided that enables roller ski poles to be used for propulsion, balance and protracted braking.

DETAILED DESCRIPTION

Figure 1:
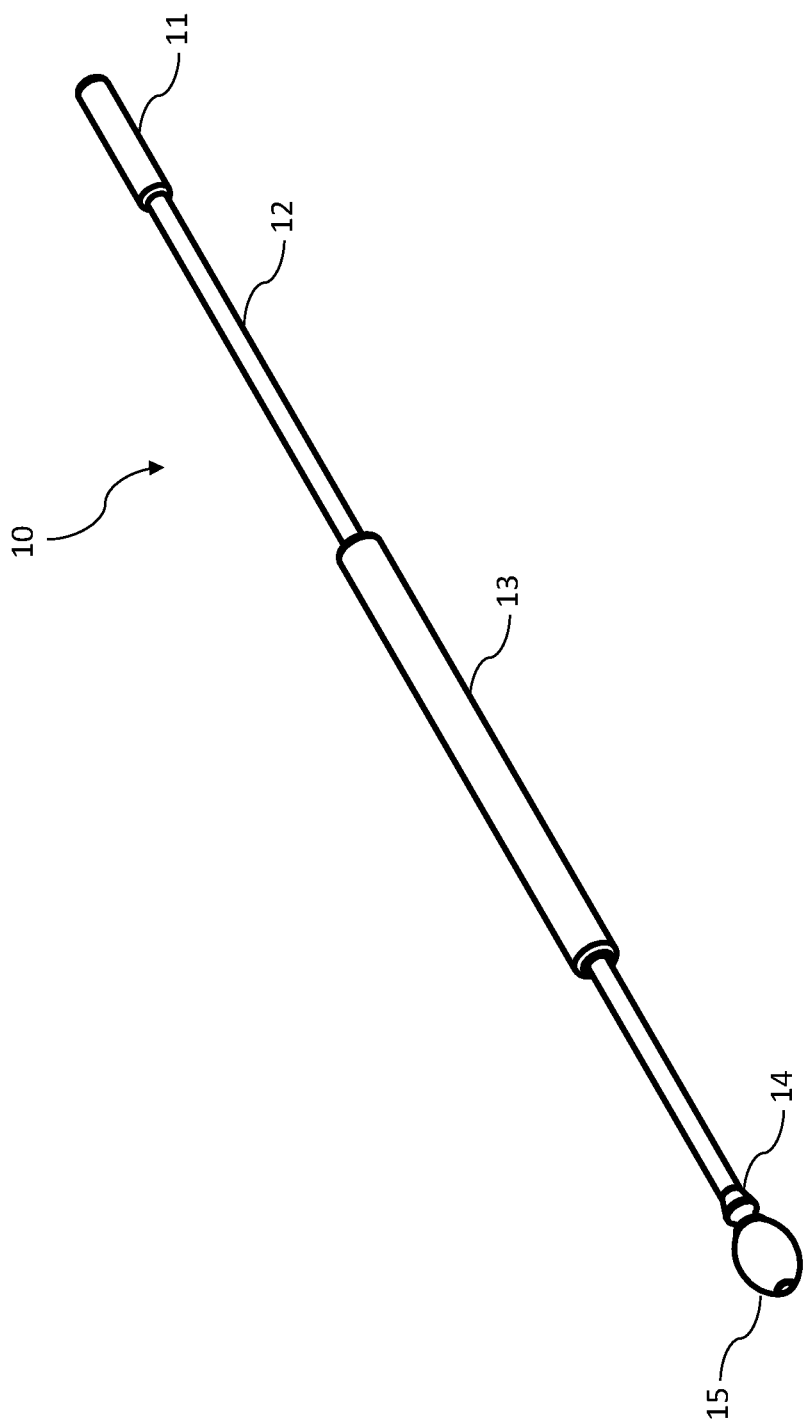
FIG. 1 shows one variation the soft-tipped pole comprising a rigid shaft, elastomeric soft bulb tip, leg pad and hand grip.

Described herein are designs and methods for providing balance and braking of human powered wheeled vehicles that roll on pavement and other rolling surfaces. The inability to slow down or otherwise facilitate control and upright stability of a skateboarder, roller skater or other human powered wheeled vehicle rider can be a challenging task for the user. The soft-tipped pole and associated designs and methods of use claimed herein address these challenges.

The pole has a durable yet soft, relatively large rubber-like tip that deforms to provide large contact area with the pavement (e.g. asphalt, concrete) when pressed against the pavement by the vehicle user. In the application of braking, for example when using a caster board (e.g. Ripstik® caster board) dragging the soft tipped pole on the rolling surface slows down the rider directly rather than slowing down the vehicle itself. This approach has advantages, for example in skateboarding where mechanisms of slowing down the skateboard exist but are attached to the skateboard and can lead to the rider inadvertently falling off the skateboard due to compromising balance of the user.

The designs and methods herein described differ from and are an improvement to what currently exists. Pole tips are currently not designed for gripping pavement and do not provide a good mechanism for slowing down a rider. For example, in roller skiing, traditional metal-spike tipped snow ski poles are currently used on the pavement and hence are not effective for slowing down on pavement. Some versions of existing roller ski poles have small hard rubber elements surrounding the metal tip, but the rubber elements have insufficient softness or surface area to enable significant slowing when dragged against the rolling surface.

The soft, gripping pole tip can slow down the roller skier or skateboarder by slowing down the rider directly and by providing stability during breaking. This maneuver is accomplished by the rider dragging the pole (or 2 poles, one in each hand) in a rear trailing orientation and pressing the tip (or tips) against the asphalt. The soft elastomeric tip has a large surface area that provides superior friction and traction against the pavement. This can be enhanced by a laminated elastomer design that may contain air gaps within the soft tip (e.g., wrapped butyl inner tube) to promote light weight as well as to promote deformation and hence provide a larger gripping contact area. The tip also may contain sufficient mass (e.g., 2-6 ounces of elastomer material) and high heat stability to provide appropriate longevity (e.g., for a multiple hour exercise workout in hilly terrain).

Also, this device can enable the use of additional road-based wheeled vehicles that are derived from another environment—for example, pavement-based versions of paddle boards or kayaks for practicing and training when users are unable to travel to the water. With the propulsion, balance and braking offered by the use of these poles, these asphalt-based vehicles may become better enabled and hence more widely adopted, particularly for the less skilled user.

FIG. 1 depicts one variation of the soft-tipped pole. The pole (10) has a hand grip (11) pole shaft (12), leg pad (13), soft tip base (14), and soft tip (15). The pole can be fabricated from rigid materials such as solid hardwood, or tubing made from fiberglass, carbon fiber composite. The hand grip is made from typical materials for ski pole grips such as cork or molded elastomer. The leg pad is made of a resilient material such as a spiral wrap of handlebar tape or a tubular foam material. The soft tip base is a rigid element that serves to mount (in either a removable or permanent manner) to the pole shaft. The soft tip base may extend through the majority of the length of the soft tip to provide structural stability of the soft tip during use. The soft tip is typically comprised of 25-90 Shore A durometer elastomer (for example silicone) on the majority of its surface. The internal regions of the soft tip can additionally include bubbles or other forms of air gaps to provide additionally contact with the rolling surface under loading. The soft tip is typically 1.5"-3" (1.5 inches-3 inches) (about 3.8 cm-7.6 cm) diameter and length, and typically may be ovoid, spheroid, or teardrop in overall exterior shape.

The hand and optional wrist strap (not shown) are attached to the proximal end of the pole (10). The optional leg pad resides around the pole shaft and begins at a location of 1-2 feet from the distal end of the pole. An optional pole mount may take the form of a mating thread element (not shown) and is located at the distal end of the pole shaft and interfaces with the soft tip mount. The soft tip mount has a mating thread element (14) to provide a means of secure but replaceable attachment between the pole shaft and soft tip. A short strip of hook and loop fastener may be used as an additional form of securement to keep the soft tip pole mount from inadvertently loosening (e.g. via unscrewing) during use. The soft tip base may also be integral to the soft tip mount as it can provide the load bearing structure around which the elastomer of the soft tip is mounted, via adhesive, solvent bonding, wrapping, insert molding, interference fit, mechanical fasteners or any combinations thereof.

The elastomer or otherwise tractive tip extends off the distal end of the pole as well as laterally off the end of the pole in a radially symmetric fashion to provide ample braking power via a wide range of pole angles and pole axis rotations.

Figure 2:
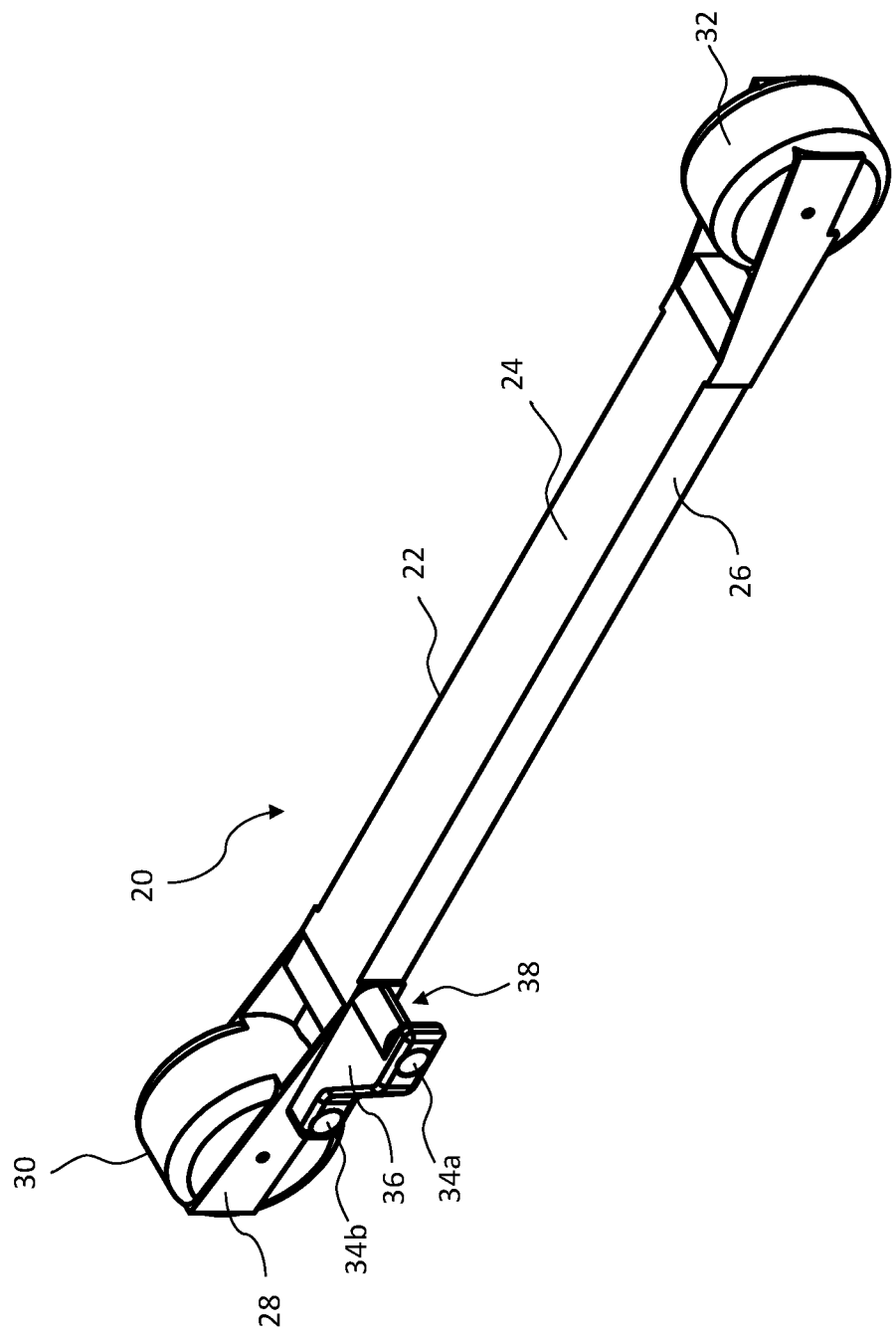
FIG. 2 shows one variation of a roller ski with a fulcrum element mounted on the side of a roller ski in the vicinity of the rear wheel.

FIG. 2 depicts a typical roller ski (20) with roller ski body (22) having top and side surfaces (24 and 26) respectively), wheel flange (28), rear wheel (30), and front wheel (32). Ski boot bindings (not shown) are typically mounted on the top surface (24) of the roller ski body. During use, ski boots (not shown) are typically mounted to the roller ski via the ski boot bindings. A fulcrum element (36) resides on the side of the roller ski body in the vicinity of the rear wheel. The fulcrum element may be fastened to the roller ski body via bolts or rivets (34a, 34b) to the side surface and wheel mount of the roller ski. The fulcrum element has a yoke region (38) at the leading edge of the fulcrum element.

In use, the user (e.g., caster boarder, roller skier) holds the pole via the pole grip. A wrist strap (not shown) may be particularly useful in roller ski applications. The poles may be used in a manner similar to the manner in which cross country skiers (e.g., skate skiers) use their poles when on snow (e.g., to assist in forward propulsion and balance). However, in addition, and in contrast to cross country skiing techniques, the poles of the herein described invention are designed to be used for braking on pavement. To provide braking, the user holds the pole (typically one in each hand and via the hand grip) with the tip trailing obliquely against the pavement, and then presses the soft tips at the distal ends of the poles firmly against the pavement, providing frictional drag directly to the user, to slow the user down. Since wheeled devices (e.g., roller skis) cannot be slowed by pointing the roller ski toes towards each other as their counterparts in snow skis can be used in snow (also known as a "snowplow" technique), methods of slowing on roller skis are more limited. These soft rubber-tipped poles, when pressed firmly against the rolling surface (e.g., pavement) via the user's hand, wrist or forearm, can provide significant stopping power. The relatively large size of the soft tip in relation to the pole shaft diameter ensures a generous contact area of the soft tip. This material and sizing allows the user to employ the pole for a significant period of time without the need for replacement. The tips are also quiet and are generally designed to be sufficiently soft and compliant so as to minimally mark or score the pavement during use. The layered elastomer design with air gaps minimizes the bouncy quality that would otherwise be encountered by using, for example a high durometer solid rubber tip. In a preferred embodiment of the invention, the tip deforms to create a significant footprint (e.g., 1 inch wide or greater), to achieve a large frictional area to enhance frictional stopping force. The use of these soft tipped poles can also be a valuable learning step for less experienced roller skiers, skateboarders and roller skaters who may not have the advanced skills to slow or otherwise control and balance themselves on wheeled devices on various forms of pavement. Therefore it is likely that many more people will be able to learn and enjoy recreational activities on wheeled vehicles on pavement such as skateboards, roller skies, roller blades, land paddle boards, and even wheeled kayaks. A pole with double ended grip tips can be used for propulsion and braking for wheeled kayaks. The replaceable tips allow the user to replace a worn tip, without the need to purchase an entire new roller ski pole.

Figure 3:
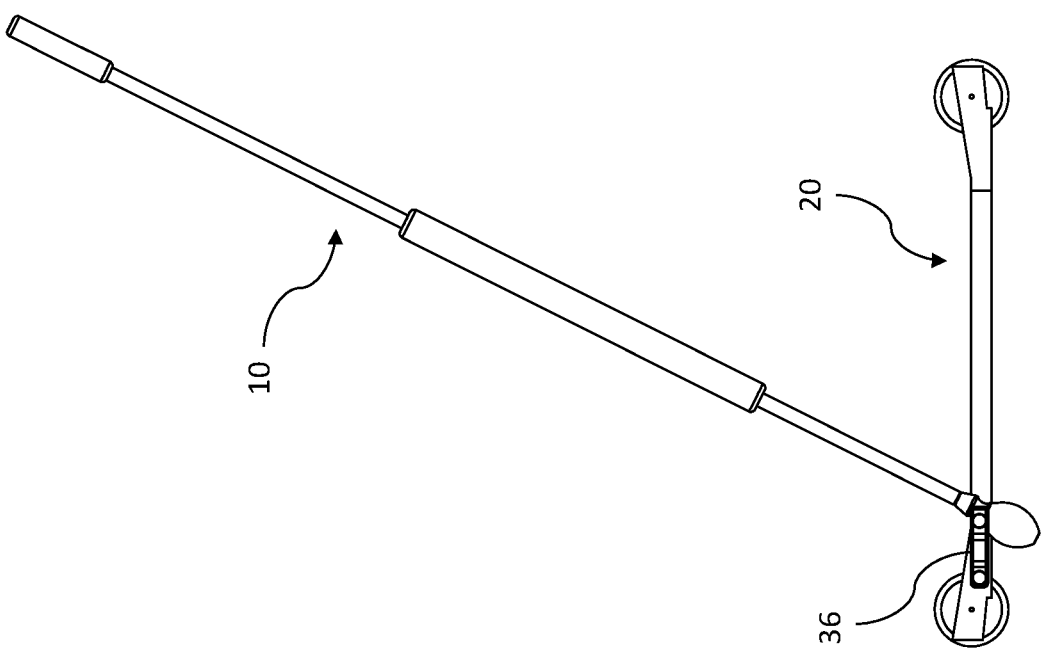
FIG. 3 shows a side view of a soft-tipped pole positioned against the fulcrum element during braking.

FIG. 3 depicts a side view of the roller ski (20) and soft-tipped pole (10) during breaking. To effect braking, the user holds the hand grip and seats the pole mount into the yoke region of the fulcrum element (36). In this figure, the pavement resides immediately below the soft tip. The user can adjust the degree of braking by changing the angle of the pole relative to the pavement while keeping the pole engaged in the yoke of the fulcrum element. Positioning the pole at a more acute angle provides less braking force while a more perpendicular angle provides greater braking force against the pavement as the pole is engaged within the yoke region of the fulcrum element.

Figure 4:
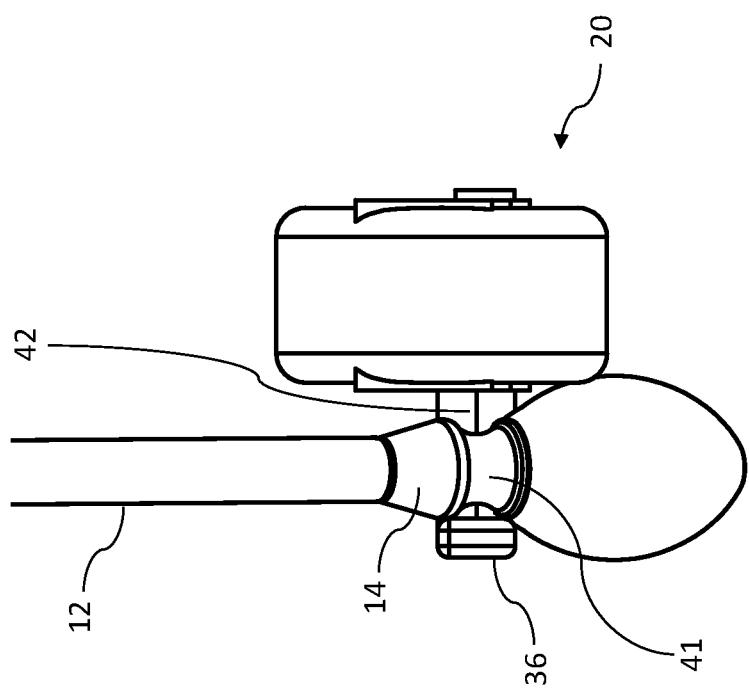
FIG. 4 shows a rear view of a soft-tipped pole positioned against the fulcrum element during braking.

FIG. 4 depicts a front view of the roller ski (20) and soft-tipped pole (10) in the position to impart braking. The pole mount (14) contains an indented engagement region (41) that releaseably engages into the yoke region (38) of the fulcrum element at the region of the rounded bearing surface (42) of the fulcrum element. The yoke region is configured to help prevent the pole mount from inadvertently disengaging from the engagement region (41) during use. Although not apparent in the FIG. 4, the engagement region (41) has a smoothly radiused surface so that as it bears the load of the pole during braking, it may permit continuously variable pole angle changes. As can be seen in FIG. 4, the wheel of the roller ski is shown to be parallel to the pole shaft and perpendicular to the pavement surface. In another method of increasing the braking force, the user can slightly cant or tilt the roller ski in the counterclockwise direction as viewed in FIG. 4. Tilting the roller ski in this lateral direction (i.e. so that the roller ski wheel is no longer perpendicular to the pavement) thereby forces the soft tip more firmly into the pavement via the fulcrum element, and subsequently increases the braking force. Therefore, the breaking force imparted by the soft pole tip may be varied by changing the overall pole angle relative to the pavement (as viewed in FIG. 3), but also may be varied by tilting the roller ski laterally (as viewed in FIG. 4), relative the pavement, as the pole tip is engaged in the yoke region.

The various components of the device can all be made by conventional manufacturing techniques and primarily via extrusion, machining and molding. The pole and soft tip may be constructed out of wood, plastic, aluminum, fiberglass or carbon fiber so as to be light in weight to prevent arm fatigue, but have also to provide sufficient rigidity against bending to exert the desired force of the soft tip against the road surface when applied by the arms, legs, hands, or combination thereof. The soft pole tip can be fabricated by liquid injection molding of low and medium durometer elastomers typically 25-90 Shore A range such as silicones as well as various thermoplastic elastomers and urethanes. Other elastomers include butyl rubber as well as foamed polymers. Laminated butyl rubber versions can be utilized and may be further enhanced by bonding the flattened butyl tubing layers together via multiple fasteners such as tacks as well as via rubber cement and other solvent bonding techniques to prevent unraveling of the wrapped tubing layers (e.g., bicycle inner tube) from wear and degradation that would be typically encountered during use.

The soft, relatively large surface area elastomer of the soft tip is helps to provide a large gripping footprint when the soft tip is dragged against the pavement. Sufficient shaft length is necessary to press the soft tip against the pavement without excessive leaning or crouching, and it can also serve as a lever arm to increase braking force against the pavement. The leg pad is optional but useful for cushioning the leg when the leg is used as a fulcrum surface (typically just below the knee) to press the pole against the pavement for additional stopping leverage during use of the caster board, wave board, skateboard or other rolling device. The soft tipped pole is generally not attached to the vehicle but in some instances, it can be mounted to the rolling device to provide an integral lever style brake for example, for a skateboard. Replaceable versions of the soft tips are a useful option, as are the wrist straps. In addition to the roller ski, a load bearing fulcrum element may also be attached to a skateboard or similar rolling device. As with the roller ski, the fulcrum element may be fastened to the rolling device in the vicinity of the rear wheel so that the fulcrum device projects laterally relative to the direction of forward motion. The fulcrum element can engage with the soft tipped pole for continuously adjustable braking as described elsewhere herein.

For balance, propulsion or braking, one or two poles can be used. For balance or propulsion, the poles are used as they would be used on an analogous non-pavement surface (e.g. water or snow). By touching the rubber pole tips against the pavement, they help the user remain upright or stay on course and can also help with propulsion. The soft tips are more comfortable than, for example, the typical hard (e.g. metal) pole tips and can hence reduce arm and joint fatigue and stress (e.g. to the elbows and shoulders) during propulsion. For braking, these soft tipped poles can be used by trailing the pole behind the body and pressing firmly and obliquely on the pole to press an oblique end of the soft pole tip firmly against the pavement. When pressure is applied, the soft rubber tip deforms and flattens slightly to provide greater surface area of contact with the pavement and therefore provide more braking force. Additional stopping power can be provided by pressing the tip more firmly against the pavement and this may be accomplished by increased leverage with the use of the lower leg as a lever fulcrum point (e.g., during skateboarding, wave-boarding) or with the use of the forearm as a lever fulcrum point (e.g., during roller skiing). A forearm pad (not shown) which can be used for bodily protection during falls, can also be used to press against the pole to serve as fulcrum point for increased stopping leverage. The forearm pad can be configured with sufficient bulk to enhance leverage as well as to releaseably couple to a section of the pole during stopping. The relatively wide footprint of the rubber tip enhances stopping power as well as provides durability as the amount of rubber is relatively large relative to rubber roller skate brakes that can wear out quickly on coarse or otherwise abrasive pavement such as asphalt. Since the majority of the mass that needs to be slowed down is the user or rider and not the wheeled vehicle itself (e.g., skateboard, roller ski), it can be easier to maintain balance when braking with the rubber tipped poles than, for example, a mechanical foot brake on a skateboard or roller skate. Use of the poles also provides additional points of balance during braking thereby reducing the risk of falling. So, even while using existing brakes that are integral to the wheeled vehicle, as with for example roller skate brakes, the soft rubber tipped poles that are the subject of this invention can still provide additional utility.

The soft tipped poles may also be used as a walking aid for hikers on rocky sloped or otherwise treacherous surfaces. Roofers may use them for more safely walking on sloped roofs without poking or otherwise damaging the roof. This devices described herein may also help enable the use of additional road-based wheeled vehicles that come from another environment—for example, pavement-based versions of paddle boards or kayaks for practicing and training—when the user is unable to travel to the water. With the propulsion, balance and braking offered by the method of use of the poles and apparatus described herein, it is anticipated that these pavement-based vehicles may become additionally enabled and/or more widely adopted.

The invention claimed is:

1. A method for controlling a human powered rolling vehicle on pavement comprising:

manually grasping a freestanding pole comprising a soft elastomeric tip at one end of the freestanding pole, a hand grip at the other end of the freestanding pole, and a padded region comprising a resilient material positioned therebetween, wherein the padded region engages with a fulcrum surface on a lower leg of a rider below the knee to vary the braking force while riding, and wherein the padded region cushions the lower leg upon engagement with the freestanding pole;

engaging the padded region of the pole against the lower leg of the rider;

pressing the soft elastomeric tip against the pavement to effect braking that directly reduces the speed of the rider; and enhancing the braking force by increasing leverage upon the soft elastomeric tip using the lower leg below the knee as a lever fulcrum point.

2. The method of claim 1, wherein the human powered rolling vehicle is a caster board.

3. The method of claim 1, wherein the freestanding pole is further used to propel the human powered rolling vehicle.

4. The method of claim 1, wherein the freestanding pole is further used to balance the rider on the human powered rolling vehicle.

5. The method of claim 1, wherein the human powered rolling vehicle is a wheeled paddle board.

6. The method of claim 1, wherein the human powered rolling vehicle is a wheeled kayak.

7. The method of claim 1, wherein the freestanding pole is removably attached to the human powered rolling vehicle.

8. The method of claim 1, wherein the soft elastomeric tip is removably attached to the freestanding pole.

9. The method of claim 1, wherein the exterior shape of the soft elastomeric tip is an ovoid, a spheroid, or a tear drop shape.

* * * * *